(12) United States Patent
Rankin et al.

(10) Patent No.: US 11,294,636 B2
(45) Date of Patent: Apr. 5, 2022

(54) SYSTEM AND METHOD FOR EXPANDING A SET OF RANDOM VALUES

(71) Applicants: John Rankin, Morgantown, WV (US); Phillip Wayne Coffelt, North Canton, OH (US)

(72) Inventors: John Rankin, Morgantown, WV (US); Phillip Wayne Coffelt, North Canton, OH (US)

(73) Assignee: Rankin Labs, LLC, Williamsport, OH (US)

( * ) Notice: Subject to any disclaimer, the term of this patent is extended or adjusted under 35 U.S.C. 154(b) by 172 days.

(21) Appl. No.: 16/287,624

(22) Filed: Feb. 27, 2019

(65) Prior Publication Data
US 2019/0265951 A1  Aug. 29, 2019

Related U.S. Application Data

(60) Provisional application No. 62/636,484, filed on Feb. 28, 2018.

(51) Int. Cl.
*G06F 7/58* (2006.01)

(52) U.S. Cl.
CPC .............. *G06F 7/588* (2013.01); *G06F 7/58* (2013.01); *G06F 7/582* (2013.01)

(58) Field of Classification Search
CPC . G06F 7/58; G06F 7/582; G06F 7/588; G06F 7/586
USPC ................................. 708/250, 255
See application file for complete search history.

(56) References Cited

U.S. PATENT DOCUMENTS

| | | |
|---|---|---|
| 3,688,090 A | 8/1972 | Rankin |
| 5,727,062 A | 3/1998 | Ritter |
| 6,023,724 A | 2/2000 | Bhatia et al. |
| 6,567,416 B1 | 5/2003 | Chuah |
| 6,714,985 B1 | 3/2004 | Malagrino et al. |
| 6,757,248 B1 | 6/2004 | Li et al. |
| 7,103,025 B1 | 9/2006 | Choksi |
| 7,734,046 B2 | 6/2010 | Urban et al. |
| 8,374,091 B2 | 2/2013 | Chiang |
| 8,397,151 B2 | 3/2013 | Salgado et al. |
| 8,577,038 B2 * | 11/2013 | Kameda ............. H04N 21/2347 380/268 |
| 9,350,663 B2 | 5/2016 | Rankin |
| 10,574,439 B2 | 2/2020 | Rankin et al. |
| 10,725,743 B2 | 7/2020 | Rankin |

(Continued)

OTHER PUBLICATIONS

Information Sciences Institute, University of Southern California, RFC 791, Internet Protocol, DARPA Internet Program Protocol Specification, Sep. 1981.

(Continued)

*Primary Examiner* — Emily E Larocque
(74) *Attorney, Agent, or Firm* — Standley Law Group LLP

(57) ABSTRACT

A system and method for producing an expanded set of random values is provided. An initial random value input set is separated into a first group, a second group, and a third group. A first value from the first group, a second value from the second group, and a third value from the third group are retrieved. A mathematical operation associated with the third value is retrieved from a set of mathematical operations. The retrieved mathematical operation is applied to the first value and the second value to arrive at a first new random value.

24 Claims, 3 Drawing Sheets

(56) References Cited

U.S. PATENT DOCUMENTS

| | | |
|---|---|---|
| 2001/0017844 A1 | 8/2001 | Mangin |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2003/0031198 A1 | 2/2003 | Currivan et al. |
| 2003/0223582 A1* | 12/2003 | Dagan ............... G06F 7/582 380/210 |
| 2005/0265126 A1 | 12/2005 | Izawa et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2007/0223395 A1 | 9/2007 | Lee et al. |
| 2010/0002868 A1 | 1/2010 | Willoughby |
| 2010/0103830 A1 | 4/2010 | Salgado et al. |
| 2011/0149891 A1 | 6/2011 | Ramakrishna |
| 2011/0231564 A1 | 9/2011 | Korsunky et al. |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0094650 A1 | 4/2013 | Mendel |
| 2013/0343377 A1 | 12/2013 | Stroud et al. |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2015/0100613 A1 | 4/2015 | Osiecki et al. |
| 2015/0113028 A1* | 4/2015 | Boppana ............. G06F 7/582 708/256 |
| 2015/0229714 A1 | 8/2015 | Venkatsubra et al. |
| 2016/0241388 A1* | 8/2016 | Ross ................... H04L 9/001 |
| 2016/0269294 A1 | 9/2016 | Rankin |
| 2017/0090872 A1 | 3/2017 | Mathew et al. |
| 2017/0244560 A1 | 8/2017 | Brandstatter |
| 2017/0279603 A1 | 9/2017 | Chen et al. |
| 2018/0018147 A1 | 1/2018 | Sugawara |
| 2018/0102975 A1 | 4/2018 | Rankin |
| 2020/0177369 A1 | 6/2020 | Rankin et al. |
| 2020/0241960 A1* | 7/2020 | Yanovsky ......... H03M 13/1148 |

OTHER PUBLICATIONS

Postel, J., Rfc 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

* cited by examiner

SYSTEM AND METHOD FOR EXPANDING A SET OF RANDOM VALUES

CROSS-REFERENCE TO RELATED APPLICATIONS

This application claims the benefit of U.S. Provisional Application Ser. No. 62/636,484 filed Feb. 28, 2018, the disclosures of which are hereby incorporated by reference as if fully restated herein.

TECHNICAL FIELD

Exemplary embodiments relate generally to a system and method for expanding a set of random values.

BACKGROUND AND BRIEF SUMMARY OF THE INVENTION

Random numbers are useful for many applications including scientific testing, statistics, art, cryptography, gaming, and gambling, to name a few examples. Random numbers may be used for purposes of scientific analysis to simulate the tosses of a coin, the rolling of a die, the occurrences of automobile accidents, the births and deaths of individuals in a population, and whatever physical phenomenon is capable of a statistic description. From a calculation point of view, random numbers may be used to randomize experiments in the laboratory (eliminating observational bias), to ensure random sampling in statistical surveys (in population studies, census taking, forecasting, and the like), to provide the randomizing element in any industrial quality control procedure, for security encryption, and to aid in the performance of many other mathematical tasks, just to name a few possible applications.

Pseudo random number generators are algorithms which may be used to simulate randomness. While effective in some applications, pseudo random number generators do possess some level of predictability. The closer one can get to simulating or recreating true randomness, the more effective the random number generation is.

In some applications, a set or block of random numbers may be required. An exemplary application for a block of random numbers is cryptography, where the block of random numbers may be used as the basis for encoding a block of data. Again, the closer one can get to simulating or recreating true randomness, the more effective the cryptography, and therefore security, will be. As those of skill in the arts will recognize, this is just one exemplary application.

A block or set of random numbers can be produced through, for example without limitation, the use of two large groups: first, a group comprised of measuring devices whereby irregular patterns of natural phenomena may be measured and recorded in the form of numbers; and second, a group comprised of computing machines whereby the measurement of erratic behavior can be transformed into numbers. Exemplary objects of measurement for the first group are phenomena such as thermal motion of electrons in a resistor, variation in electron emission from a heated cathode, Brownian motion of microscopic particles suspended in a fluid, arrival times of cosmic rays, outcomes in games of chance, and the like. Devices have been designed expressly to measure such natural phenomena such as electrical amplifiers, microscopes, Geiger counters, and other electromechanical devices. Computing machines of the second group of devices have been designed to measure erratic behavior in the interaction and interfacing between solid state computing and physical and electrical operations of devices and networks.

While these two large groups of devices may be configured to produce a block or set of random numbers, the time necessary to transform these observations into usable numbers may be a limiting factor for use. Since the creation of truly random numbers depends upon the observation of random events, there are inherent timing factors which may directly affect the creation of a set of random numbers. Therefore, the usefulness of such a set of truly random numbers may be limited due to the time necessary for its creation. Use of a purely mathematical formula to create a larger set of random numbers would be biased by its own regulated application. As such, a faster system and method for producing a larger set or block of random numbers is needed. Furthermore, this system and method must utilize the smaller set of random numbers in a way that will extend the randomness of the initial set while increasing the size of the set to something usable. Therefore, what is needed is a system and method for expanding a set of random values.

A system and method for expanding a set of random values is provided. This disclosure provides a system and method where a manipulative process may be applied against one or more sets of random numbers in order to produce a larger set of random numbers that maintains the random character of the smaller, initial inputs. By dividing the original set of numbers into three or more sets of random numbers and applying a random series of mathematical operations between them, the original randomness will be reflected in the resulting larger set. In this way, a significantly larger set of random numbers may be produced. This larger set of random numbers may allow for greater use from the original, smaller set of random inputs without the need to wait for the observation of additional random events. The three or more sets of random numbers may be random in size. Values other than numbers may be used in exemplary embodiments.

Further features and advantages of the systems and methods disclosed herein, as well as the structure and operation of various aspects of the present disclosure, are described in detail below with reference to the accompanying figures.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
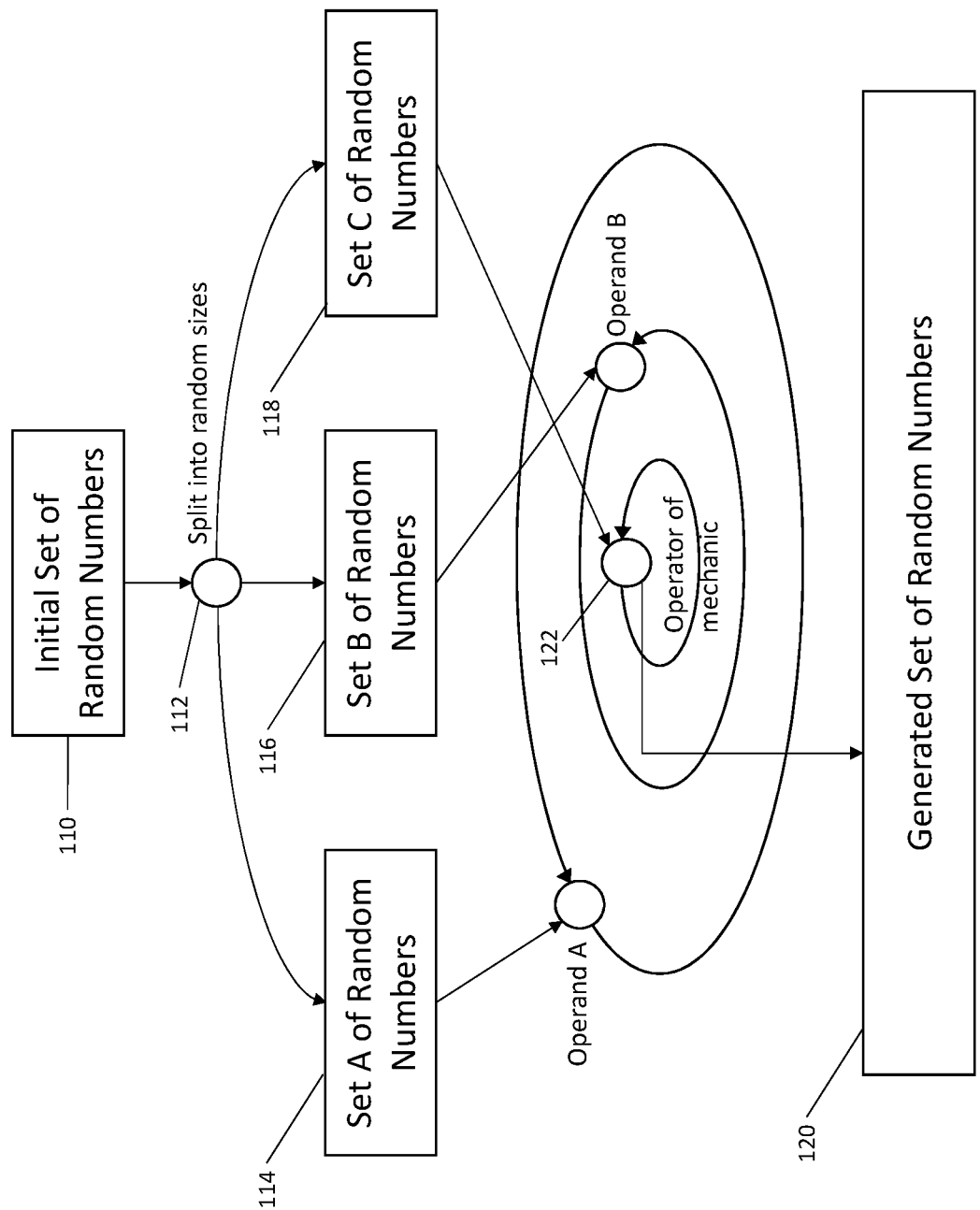
FIG. 1 is a simplified diagram depicting an exemplary expansion of a set of random numbers into a larger, usable set of random numbers.

Referring to FIG. 1, a set of random numbers 110 may be divided 112 into three or more sets: set A 114, set B 116, and set C 118, for example without limitation. Each set 114, 116, and 118 may be of a varying size. In exemplary embodiments, the size of the sets 114, 116, and 118 is itself random. Each set 114, 116, and 118 may be of the same, or of a different, size. Set A 114 and set B 116 may be used as operands, or elements, to be expanded. In exemplary embodiments, the initial set of numbers 110 may be comprised of truly random numbers.

The system and method may include a series of mathematical operations (hereinafter also "the mechanic" 122) which may be applied to elements from sets A 114 and B 116. The numbers in set C 118 may be used to select the mechanic 122 for application with values from set A 114 and set B 116. In other words, set C 118 may be the set of random numbers that provides the random values to be used to select a mechanic 122 for use on the values from set A 114 and set B 116, herein the value from set C 118 is also termed "Q". Set D 120 may be the expanded set of random numbers produced through the application of the mechanic 122, selected using set C 118, and applied to the random numbers from set A 114 and B 116. In exemplary embodiments where more than three sets 114, 116, and 118 are utilized, the mechanic 122 may be applied to values from any number of sets 114, 116, and 118. Furthermore, while the provided example selects the mechanic 122 based on the value from set C 118, it is contemplated that the value for the mechanic 122 may come from any of the sets 114, 116, and 118.

The set C 118 may be used to select the mechanic 122 operation that will be used to perform a transformation on elements in set A 114 and set B 116 to produce one element for set D 120. In exemplary embodiments, set A 114 and set B 116 may be placed into a nested loop and be continually used until the desired number of elements in set D 120 are produced, which may be the desired random number of elements in set D 120. Set C 118 may be continually looped for the selection of the mechanic 122. In exemplary embodiments where set A 114 and set B 116 are in a nested loop, and set C 118 is in a conventional loop, set D 120 will never have the same two elements from set A 114 and set B 116. Furthermore, set D 120 will never have the same mechanic 122 from set C 118 applied.

The term "Mechanic" 122 is used herein to denote the operand or operations that may be applied against elements from set A 114 and set B 116. The following are examples of mechanics 122, where $a_r$ and $b_s$ represent elements from set A 114 and set B 116:

[1] $a_r \times b_s$
[2] $a_r + b_s$
[3] $a_r - b_s$
[4] $b_s - a_r$
. . . .
etc.

The above mechanics 122, as those of skill in the art will recognize, are merely exemplary and are not intended to be limiting. Any mathematical operation is contemplated, such as but not limited to, addition, subtraction, multiplication, division, some combination thereof, or the like. For example, in embodiments where more than three sets 112, 114, or 116 are used, the mechanics 112 may likewise be expanded to utilize all remaining sets 112, 114, or 116. Each operation within the set of possible mechanics 122 may be simple in nature, in exemplary embodiments without limitation, and applied against only one element from set A 114 and set B 116. The absolute value of the resulting number may be taken. Each additional element added to set D 120 may further iterate the random data such that more random numbers may be obtained from a smaller amount of quantified random observations. The mechanics 122 may be predetermined and stored in a local or remote electronic storage device.

Figure 2:
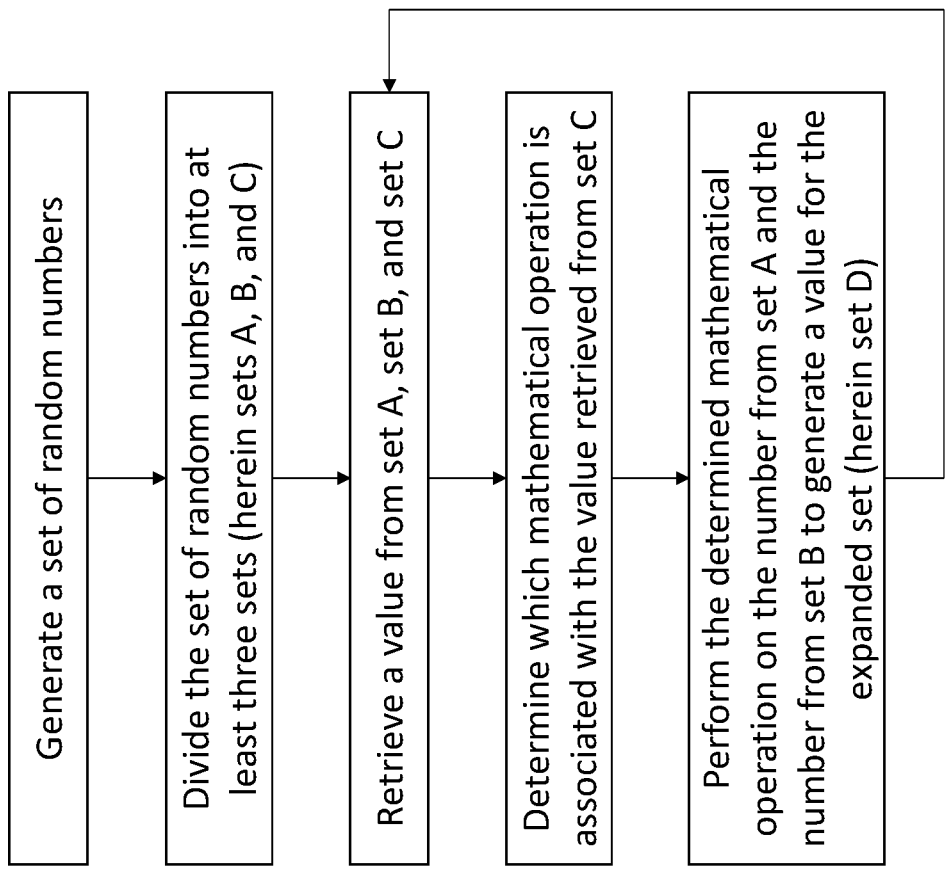
FIG. 2 is a flow chart illustrating exemplary logic.
Figure 3:
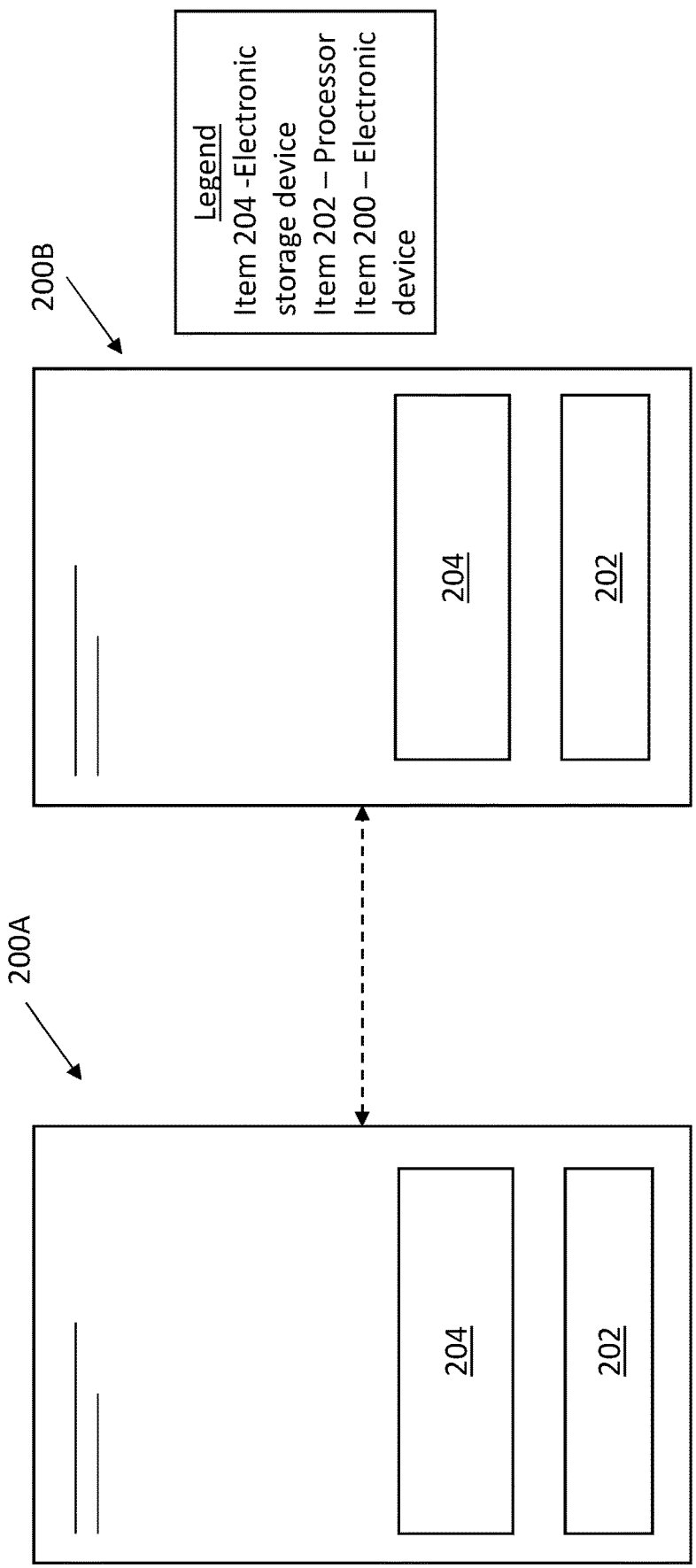
FIG. 3 is a front view of an exemplary system for implementing the techniques of FIG. 1-2.

FIG. 2 is a flow chart illustrating exemplary logic. An initial set of random numbers 110 may be generated and subdivided into at least three subsets 114, 116, and 118. These subsets 114, 116, and 118 may be of random size(s). For convenience, these subsets may be referred to herein as set A 114, set B 116, and set C 118. A value may be retrieved from each set 114, 116, and 118. In exemplary embodiments, numbers may be retrieved sequentially. The value pulled from set C 118 may be used to determine a mathematical operation(s) to be performed on the values from set A 114 and set B 116. However, in other embodiments, the value used to determine the mathematical operation(s) to be performed may be pulled from either set A 114 or set B 116 and the values from the remaining sets 112, 114, or 116 may be operated on.

In exemplary embodiments, a number of predetermined mathematical operations are stored in a connected electronic storage device and each operation is associated with a given value. The determined mathematical operation may be performed against the values from the remaining sets 112, 114, or 116 to generate a first value for a new set 120, which for convenience is referred to herein as set D 120. The mathematical operation performed may comprise addition, subtraction, multiplication, division, some combination thereof, or the like. The absolute value of the resulting number may be taken. Subsequent values may be pulled from the subsets 114, 116, and 118 and the process may be repeated.

In some exemplary embodiments, the subsets 114, 116, and 118 may be combined with the new set D 120 in order to create an expanded set of random numbers.

Certain operations described herein may be performed by one or more electronic devices 200A, B. Each electronic device 200A, B may comprise one or more processors 202, electronic storage devices 204, executable software instructions, and the like configured to perform the operations described herein. The electronic devices 200A, B may be general purpose or specialized computing devices. The electronic devices 200A, B may be personal computers, smartphone, tablets, databases, servers, or the like.

While several exemplary embodiments are described herein with respect to numbers, those of skill in the arts will recognize that in other exemplary embodiments any type of value may be utilized.

Any embodiment of the present invention may include any of the optional or exemplary features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for improving encryption of electronically transmitted communications by use of newly generated random values from an initial random value input set, said method comprising the steps of:
   receiving a message for encrypted transmission;
   separating the initial random value input set into a first group, a second group, and a third group;
   retrieving a first value from the first group, a second value from the second group, and a third value from the third group;
   retrieving a mathematical operation associated with the third value from a set of mathematical operations;
   applying the retrieved mathematical operation to the first value and the second value to arrive at a first new random value;
   encrypting the message by assigning at least the first new random value to at least one variable of at least one encryption algorithm and applying said at least one encryption algorithm to the message to generate an encrypted communication; and
   transmitting said encrypted communication to at least one other computing device by way of one or more networks;
   wherein said receiving, separating, retrieving, applying, encrypting, and transmitting steps are carried out electronically at one or more computing devices.

2. The method of claim 1 further comprising the steps of:
   retrieving a fourth value from the first group, a fifth value from the second group, and a sixth value from the third group;
   retrieving a second mathematical operation associated with the sixth value; and
   applying the retrieved second mathematical operation to the fourth value and the fifth value to arrive at a second new random value.

3. The method of claim 1 wherein:
   the steps of retrieving values from the first, second, and third groups, retrieving the mathematical operation associated with the value retrieved from the third group, and applying the retrieved mathematical operation to the values retrieved from the first and second groups is repeated until a new set of random values of a predetermined size is generated; and
   said step of encrypting the message using at least the first new random value comprises using the new set of random values.

4. The method of claim 3 further comprising the steps of:
   combining the first group, the second group, the third group, and the new set of random values.

5. The method of claim 1 wherein:
   the first group, the second group, and the third group are random in size.

6. The method of claim 5 wherein:
   the first group, the second group, and the third group are of different sizes.

7. The method of claim 5 wherein:
   the first group, the second group, and the third group are of equal size.

8. The method of claim 1 wherein:
   the set of mathematical operations each comprise at least one operation selected from the group consisting of: addition, subtraction, multiplication, and division.

9. The method of claim 8 further comprising the steps of:
   taking the absolute value of the first new random value.

10. The method of claim 1 wherein:
    the step of applying the retrieved mathematical operation to the first value and the second value comprises adding or subtracting the first value to the second value.

11. The method of claim 1 wherein:
    the step of applying the retrieved mathematical operation to the first value and the second value comprises multiplying or dividing the first value by the second value.

12. The method of claim 1 wherein:
    the initial random value input set consists of numbers.

13. The method of claim 1 further comprising the steps of:
    deriving the initial random value input by observing random events occurring in nature.

14. The method of claim 13 wherein:
    the observed natural event is selected from the group consisting of: thermal motion of electrons in a resistor, variation in electron emission from a heated cathode, Brownian motion of microscopic particles suspended in a fluid, arrival times of cosmic rays, and outcomes in games of chance.

15. The method of claim 1 further comprising the steps of:
    deriving the initial random value input set by observing random events between networked computer systems.

16. A method for improving encryption of electronically transmitted communications by use of an expanded set of random numbers from an initial set of random numbers, said method comprising the steps of:
    (a) receiving a message for encrypted transmission;
    (b) deriving the initial set of random numbers;
    (c) separating the initial set of random numbers into at least a first subset, a second subset, and a third subset;
    (d) retrieving a number from the first subset ("number A"), a number from the second subset ("number B"), and a number from the third subset (number "C");
    (e) retrieving a mathematical operation associated with a value matching the number C from a plurality of mathematical operations;
    (f) performing the retrieved mathematical operation on number A and number B to arrive at a new random number;
    (g) repeating steps (d)-(f) until a predetermined number of new random numbers are generated to arrive at a new set of random numbers;
    (h) encrypting the message by assigning each number in at least the new set of random numbers to a respective variable of one or more encryption algorithms and applying said one or more encryption algorithms to the message to generate an encrypted communication; and
    (i) transmitting the encrypted communication over one or more networks to a remotely located electronic device;
    wherein steps (a)-(i) are carried out electronically at one or more computing devices.

17. The method of claim 16 wherein:
    said plurality of mathematical operations comprises adding number A to number B, subtracting number A from number B, multiplying number A from number B, and dividing number A by number B.

18. The method of claim 17 further comprising the steps of:
taking the absolute value of the new random number.

19. The method of claim 16 further comprising the steps of:
combining the first subset, the second subset, the third subset, and the new set of random numbers.

20. A method for improving encryption of electronically transmitted communications by use of an expanded set of random numbers, said method comprising the steps of:
(a) receiving messages for encrypted transmission;
(b) providing a plurality of mathematical operations, wherein each mathematical operation is a function of two variables and is associated with a value;
(c) generating an initial set of random numbers by observing erratic behaviors in nature or in electronic systems;
(d) separating the initial set of random numbers into a first group, a second group, and a third group, wherein the first group, the second group, and the third group are each of a random size;
(e) retrieving a number from the first group ("number A"), a number from the second group ("number B"), and a number from the third group (number "C");
(f) retrieving the mathematical operation associated with a value matching the number C from the plurality of mathematical operations;
(g) performing the retrieved mathematical operation on number A and number B to arrive at a new random number;
(h) taking the absolute value of the new random number to arrive at an absolute new random number;
(i) repeating steps (e)-(h) for each of the messages until a predetermined number of sets of absolute new random numbers are generated for each respective one of the messages;
(j) combining each respective one of the predetermined number of sets of absolute new random numbers with the initial set of random numbers to generate a number of new sets of random numbers;
(k) encrypting each respective one of the messages using a respective one of the number of new sets of random numbers by assigning each of the numbers in the respective one of the number of new sets of random numbers to a corresponding variable of one or more encryption algorithms and applying the one or more encryption algorithms to the respective messages to generate encrypted communications; and
(l) electronically transmitting, over one or more networks, each of the encrypted communications to at least one other, remotely located respective computing device;
wherein steps (a)-(l) are carried out electronically at one or more computing devices.

21. A system for improving encryption of electronically transmitted communications by use of newly generated random values, said system comprising:
an electronic computing device comprising one or more electronic storage devices comprising executable software instructions, which when executed, configure one or more processors to:
receive a message for encrypted transmission;
obtain an initial random value input set;
separate the initial random value input set into a first group, a second group, and a third group;
retrieve a first value from the first group, a second value from the second group, and a third value from the third group;
retrieve a mathematical operation associated with the third value from a set of mathematical operations;
apply the retrieved mathematical operation to the first value and the second value to arrive at a first new random value;
encrypt the message by assigning at least the first new random value to at least one variable of at least one encryption algorithm and applying the at least one encryption algorithm to the message to generate an encrypted transmission; and
electronically transmit the encrypted communication across one or more networks to at least one other electronic computing device.

22. The method of claim 1 wherein:
said step of encrypting the message further comprises assigning values of the initial random value input set to one or more other variables of the at least one encryption algorithm before applying the at least one encryption algorithm to the message to generate the encrypted communication.

23. The method of claim 16 wherein:
said step of encrypting the message further comprises assigning each number in the initial set of random numbers to another respective variable of the one or more encryption algorithms before applying the one or more encryption algorithms to the messages to generate the encrypted communications.

24. The system of claim 21 further comprising:
additional executable software instructions stored at the one or more electronic storage devices, which when executed, configure one or more processors to encrypt the message using at least both the initial random value input set in addition to the first new random value.

* * * * *